(No Model.)
G. MARSHALL.
Car Brake.
No. 235,267. Patented Dec. 7, 1880.
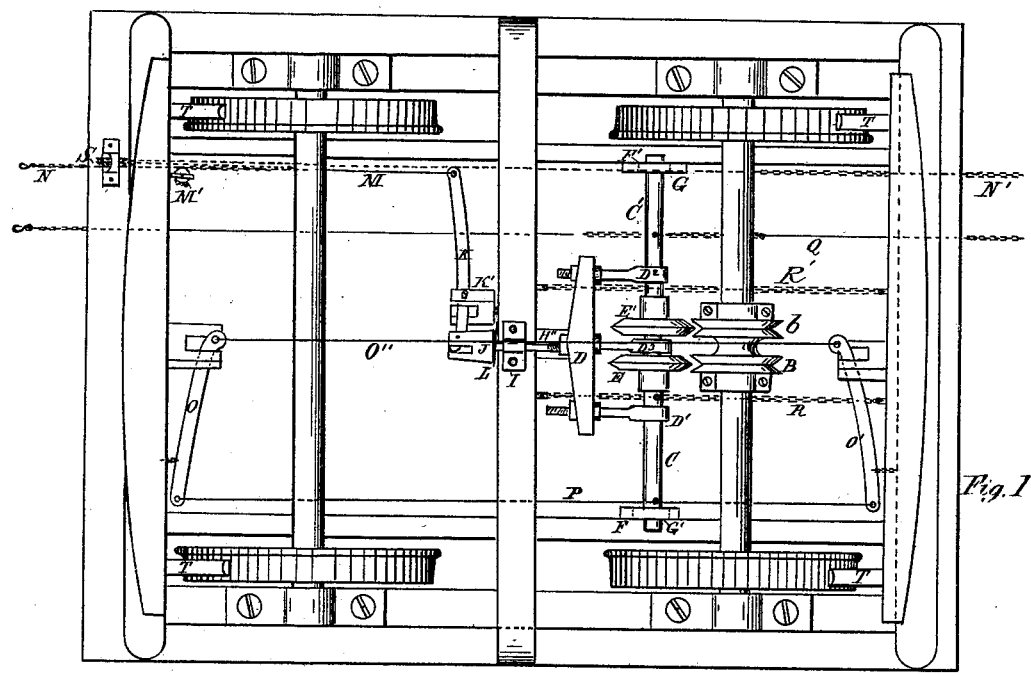
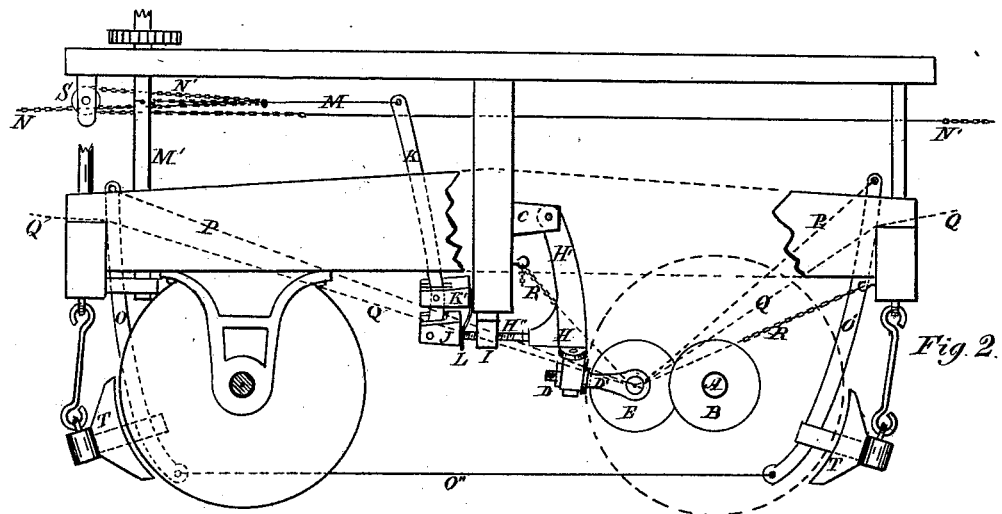
Witnesses
Lucien R. Seavey
A. F. Fremont
Inventor
Gavin Marshall
per Wm Bruce
Attorney

UNITED STATES PATENT OFFICE.

GAVIN MARSHALL, OF HAMILTON, ONTARIO, CANADA.

CAR-BRAKE.

SPECIFICATION forming part of Letters Patent No. 235,267, dated December 7, 1880.

Application filed March 25, 1880. (No model.)

*To all whom it may concern:*

Be it known that I, GAVIN MARSHALL, of the city of Hamilton, in the county of Wentworth, in the Province of Ontario, Canada, have invented certain new and useful Improvements in Railway-Car Brakes; and I do hereby declare that the following is a full, clear, and exact description of the construction and operation of the same, reference being had to the accompanying drawings, forming part of this specification.

The invention relates to further improvements on railway-car brakes for which Letters Patent of the United States were granted to me the 1st day of April, A. D. 1879, and No. 213,915, and in Canada the same year, No. 9,578, and is designed to simplify the said device and make it of less cost practically, while it is as effective in its operation and possesses all, if not more, advantages.

The brakes are so constructed that they can be applied to a whole train simultaneously by the engine-driver on the locomotive, or separately by a brakeman, who, if he is on the last car, can brake the entire train at once, and in cases of danger the brakes can be applied at both ends of a train simultaneously with such power and pressure that a train running at a high rate of speed can be brought to a stop in a very short distance.

By reference to the drawings, forming part of this specification, it will be seen that Figure 1 is a plan view of the under side of a car-truck. Fig. 2 is a side view of the same.

A is the car-axle, upon which is securely affixed a double-grooved wheel, B. It is made in two pieces or halves for convenience in putting it on and taking it off the axle, the said two parts being bolted together with four bolts and keyed on the axle, so that it becomes immovable on the shaft. One of the said wheels is placed on one truck of every car. The grooves *b* on said double-grooved wheel are V-shaped.

C C' are two small shafts supported by a frame, D, and journal-bearings D', D², and D³, the latter receiving the inner ends of said shafts, and the extreme outer ends of each passing through a bracket, F F', respectively, attached to the truck-frame. The shafts pass through slots G G' in said brackets, so as to allow a back-and-forward movement of the said shafts in their operation, as will be shown hereinafter.

E and E' are two bevel-edged friction-wheels, keyed on their respective shafts C and C', and are made to impinge on the grooves of the said wheel B, to apply friction thereto and to the axle when the brakes are to be put on to stop a train. Both wheels can be operated at once or singly, but will generally be used together.

The said frame D is supported in its place by means of an L-shaped metal hanger, H, said device being provided with two arms—an upright and a horizontal one—the former, H', having its upper end pivoted to a crotch-iron, *c*, attached to the truck-beam, so as to allow the said frame D and wheels E E' to move back and forth on a level, the slots on each of the brackets F F' allowing them to do so, and the latter, H'', passing through a keeper, I, which is secured to the truck-frame, which acts as a guide for the said arm H'' to operate in a straight line back and forth. The end of the said arm is screw-threaded and has a tapped crotch-iron nut, J, screwed thereon, so as to shorten or lengthen the said arm H'', as occasion may require it to be done.

L is a forked spring affixed to the truck-frame, the forked end of which passes on each side of the arm H'' and against the crotch-iron J, pressing back the friction-wheels E E' from the grooved wheel B when no friction is needed, or, in other words, when the brakes are not required on.

K is an operating-lever, pivoted to the crotch-iron K', fastened to the brake-frame as the fulcrum. Its lower end is secured to the crotch-iron J, and to its upper end is attached a connecting-rod or chain to the brake-mast M', for the purpose of operating the said lever, frame, and friction-wheels.

N N' are two auxiliary chains, which are fastened to the main chain M, one passing to the shaft C' of a forward car and the other going to the shaft of the rear car, so that all the cars of a train will be acted on simultaneously in a like manner. The connecting-rods will be constructed of chains and iron rods.

O O' are two outside brake-beam levers on each truck pivoted to the brake-beam, and connected together at the lower end by a connecting-rod, O'', and are in general use with the common brake, on which I claim nothing. The only use I make of them is to attach a chain, P, to each, which runs through the shaft C for the purpose of operating on the end of the said lever O and O' on each truck.

Q is a connecting rod or chain passing from the shaft C' to the chain M on the front and rear car, and is for the purpose, when operated upon, to act on the lever K when friction is to be applied on the axle, or, in other words, when the brakes are to be applied.

R is a chain, passing through the shaft C, and fastened at one end to the center truck-beam and the other to the outside truck-beam, and is for the purpose of acting as a check on the shaft C when the friction is applied too strong on the wheel B.

R' is a similar chain for the same purpose; but both may be dispensed with, if thought necessary, by simply limiting the motion of the levers O and O'.

S is a pulley fastened to the car or truck, and is for the purpose of carrying a chain, N', around it. By pulling on the said chain it operates the lever K, which applies the friction-wheels on the wheel B and axle.

T T are the brakes for the wheels as now commonly used, on which I claim nothing, but merely use them in connection with my device for braking on the axles.

The advantages of my device are: The brakes can be regulated in such a manner that the pressure can be equalized on each car. When the brakes are put on from the locomotive the engineer can brake the last car first, which prevents the concussion of the cars; also, the brakes can be applied simultaneously from both ends of a train.

The operation of my device is as follows: On turning the brake-wheel which operates the brake-mast M', the chain M, which is attached to it and the lever K, moves said lever and is the means of pushing forward the friction-wheels against the grooved friction-wheel B on the axle, which retards the revolution of the said axle and truck-wheels. At the same time the common brakes, if on a car, can be utilized and used, making an additional power to brake a train, R and R' being counteracting-chains when there is too much pressure exerted on the axle.

Applying the friction on one car produces the effect of operating the friction device on all the cars of a train when the rods N N' connect all the cars.

Having thus described my device, what I claim as my invention, is—

1. In combination with a car-truck, the shafts C and C', brackets F F', having slots G G' in same, the frame D, with journal-bearings D' $D^2$ $D^3$, as and for the purpose set forth.

2. In a car-brake, the combination of frame D, hanger H, upright arm H', crotch-arm c, arm H'', keeper I, lever K, and chain M, arranged to operate substantially as set forth.

3. The combination of the grooved wheel B, friction-wheels E E', shafts C C', brackets F F', with slots G G', frame D, journal-bearings D' $D^2$ $D^3$, hanger H, with arms H' H'', keeper I, lever K, chains M N N' P R R' Q, pulley S, spring L, irons J K', all constructed and arrenged for a car-brake, as specified.

Hamilton, Canada, March 11, 1880.

GAVIN MARSHALL.

In presence of—
JOHN G. CLOKE,
WM. BRUCE.